United States Patent
Maeda et al.

(10) Patent No.: US 8,242,659 B2
(45) Date of Patent: Aug. 14, 2012

(54) MOLD COMMUTATOR AND COMMUTATOR MOTOR USING THE SAME

(75) Inventors: Noriteru Maeda, Osaka (JP); Hirofumi Mizukami, Fukui (JP); Akihiko Yamazaki, Fukui (JP); Seiji Kurozumi, Osaka (JP); Yoshikazu Yamagata, Osaka (JP)

(73) Assignee: Panasonic Corporation, Osaka (JP)

( * ) Notice: Subject to any disclaimer, the term of this patent is extended or adjusted under 35 U.S.C. 154(b) by 406 days.

(21) Appl. No.: 12/594,891

(22) PCT Filed: Apr. 8, 2008

(86) PCT No.: PCT/JP2008/000896
§ 371 (c)(1),
(2), (4) Date: Oct. 6, 2009

(87) PCT Pub. No.: WO2008/139681
PCT Pub. Date: Nov. 20, 2008

(65) Prior Publication Data
US 2010/0141081 A1 Jun. 10, 2010

(30) Foreign Application Priority Data
May 7, 2007 (JP) ................................. 2007-122073

(51) Int. Cl.
*H02K 13/00* (2006.01)
(52) U.S. Cl. ........................................ 310/222; 310/235
(58) Field of Classification Search .................. 310/219, 310/220, 233–237
See application file for complete search history.

(56) References Cited

U.S. PATENT DOCUMENTS

| 1,369,408 | A | * | 2/1921 | Diehl | 310/235 |
|---|---|---|---|---|---|
| 3,663,458 | A | * | 5/1972 | Masuyama et al. | 252/519.52 |
| 3,924,148 | A | * | 12/1975 | Tachibana et al. | 310/220 |
| 4,871,936 | A | * | 10/1989 | Akae et al. | 310/233 |
| 5,130,596 | A | | 7/1992 | Umeki | |
| 5,266,860 | A | * | 11/1993 | Chiba et al. | 310/233 |
| 5,920,141 | A | | 7/1999 | Edgerton | 310/236 |
| 6,081,060 | A | * | 6/2000 | Du | 310/252 |
| 7,045,926 | B2 | * | 5/2006 | Breynaert et al. | 310/233 |
| 2010/0084943 | A1 | * | 4/2010 | Mizukami et al. | 310/221 |
| 2010/0141081 | A1 | * | 6/2010 | Maeda et al. | 310/220 |

FOREIGN PATENT DOCUMENTS

| JP | 61-154452 | * | 7/1986 |
|---|---|---|---|
| JP | S62-088459 | | 6/1987 |
| JP | 02-241346 A | | 9/1990 |

(Continued)

OTHER PUBLICATIONS

International Search Report for International Application No. PCT/JP2008/000896, dated Jul. 15, 2008, 2 pages.

*Primary Examiner* — Karl Tamai
(74) *Attorney, Agent, or Firm* — Brinks Hofer Gilson & Lione (57) ABSTRACT

The mold commutator of the present invention comprises a plurality of commutator segments made of copper or copper alloy and circumferentially arranged, a plurality of spark absorbing elements, disposed between adjacent commutator segments, with paired parallel surfaces respectively having electrodes thereon, and a resin mold portion which integrates these portions into one piece. The spark absorbing element is electrically connected to the commutator segment via the electrode, and spark voltage generated at the commutator segment is absorbed by current flowing between the electrodes.

12 Claims, 8 Drawing Sheets

FOREIGN PATENT DOCUMENTS

| | | |
|---|---|---|
| JP | 03-093443 A | 4/1991 |
| JP | 05-168119 A | 7/1993 |
| JP | 06-111905 * | 4/1994 |
| JP | 08-237913 A | 9/1996 |
| JP | 10-257739 A | 9/1998 |
| JP | 2006-257116 A | 9/2006 |

* cited by examiner

MOLD COMMUTATOR AND COMMUTATOR MOTOR USING THE SAME

TECHNICAL FIELD

The present invention relates to a mold commutator for displaying a commutating function of a commutator motor used in a vacuum cleaner, electric tool or the like, and a commutator motor using the same.

BACKGROUND ART

A commutator motor used in household electric appliances such as vacuum cleaner increases in spark discharge (hereinafter called spark) generated between the brush and commutator segments during operation of the motor as the motor becomes reduced in size and weight, enhanced in performance, and increased in input, and consequently, there arises a problem of being unable to ensure the brush life.

In order to solve such a problem, it is necessary to lower the spark voltage, and to take measure such as setting the specific resistance of the brush higher and reducing the number of windings of the armature, thereby ensuring the brush life. However, it is not best to employ such measure because it results in lowering of the motor efficiency.

On the other hand, in a low voltage (3~20V) type commutator motor used in information equipment, generally in order to ensure the brush life, there is externally provided with a disk-like spark absorbing element having varistor characteristic between the commutator segment and winding.

A varistor generally used as a spark absorbing element has such characteristic that it rapidly decreases in resistance value when the voltage exceeds a certain level and starts current application, and generally, the voltage in 1 mA current application is called varistor voltage.

A varistor generally employed for a commutator motor used in such information equipment as mentioned above is based on strontium titanate, and the varistor voltage ranges from about 3 V/mA to 20 V/mA.

Figure 9:
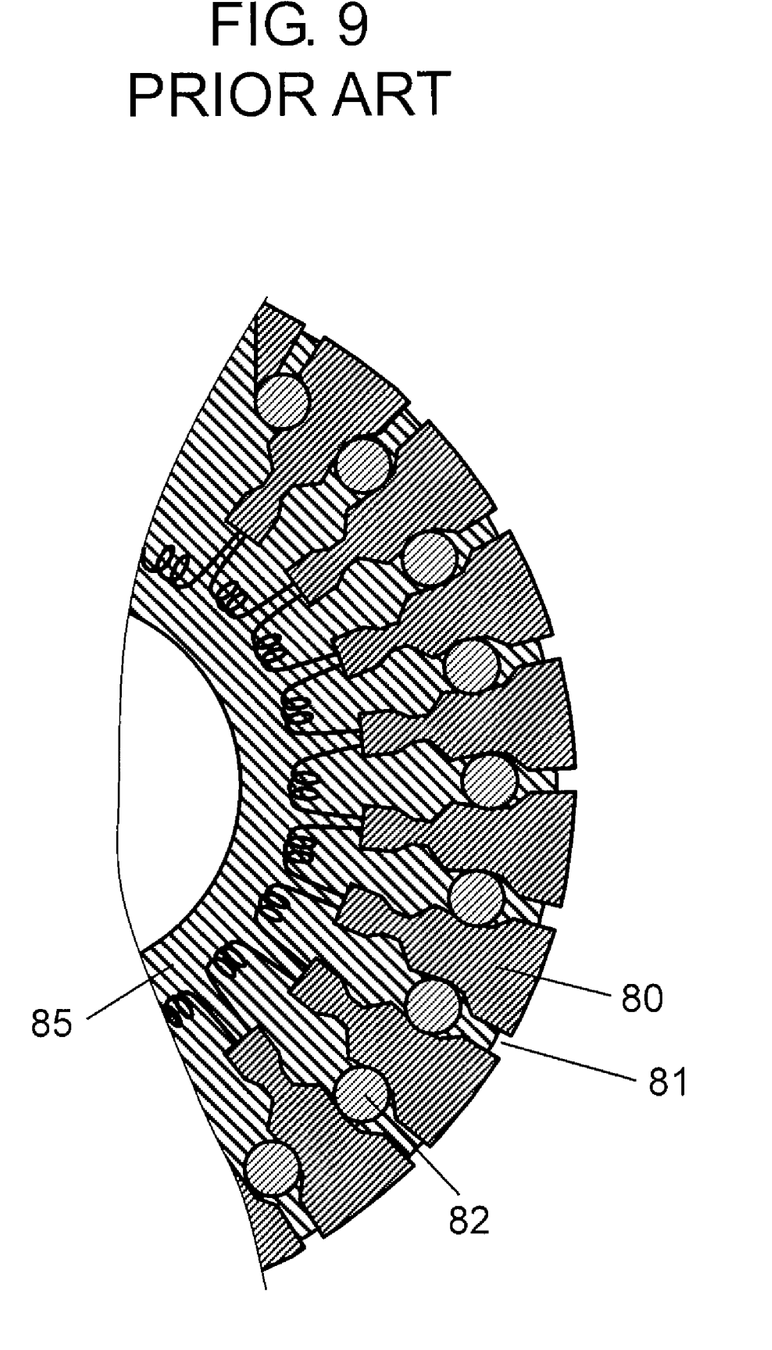
FIG. 9 is a partly sectional view of a spark absorbing element inserted portion in a conventional mold commutator.
Figure 10:
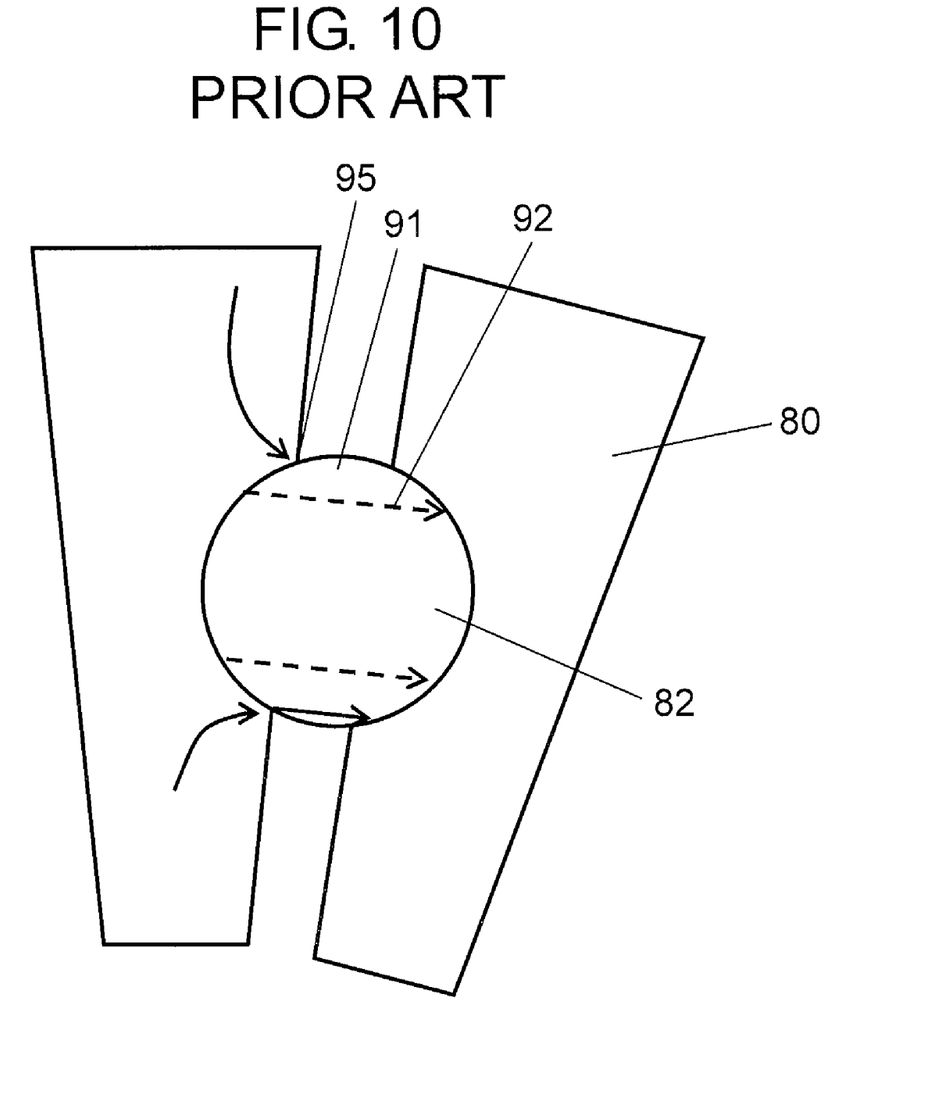
FIG. 10 is an explanatory diagram of a passage of current that flows in the spark absorbing element in the conventional mold commutator.

When the spark absorbing element is electrically connected between winding and commutator segment, an effect of absorbing electromotive forces generated in commutation switching operation can be obtained, thereby suppressing spark energy in spark generation and making it possible to prolong the brush life. As an example of prolonging the brush life by using such a spark absorbing element, for example, Patent document 1 and Patent document 2 are disclosed. In Patent document 1, an example of using a spherical spark absorbing element is disclosed, and in Patent document 2, an example of using a pin-shaped spark absorbing element is disclosed. The latter example is described in the following with reference to the drawings. FIG. 9 is a partially sectional view of a spark absorbing element inserted portion in a conventional mold commutator. FIG. 10 is an explanatory diagram of a passage of current flowing to the spark absorbing element.

The conventional mold commutator comprises a plurality of commutator segments 80 made of copper or copper alloy and circumferentially arranged, and pin-shaped spark absorbing elements 82, and resin mold portion 85 molded them integrally. Under-cut 81 is disposed between the commutator segments to separate them from each other, thereby completing the mold commutator.

Pin-shaped spark absorbing element 82 has a function of absorbing spark voltage between commutator segments 80 and also a function of fixing and reinforcing commutator segments 80 against the centrifugal forces applied to commutator segments 80 during high-speed operation. The spark voltage in operation of the commutator motor is absorbed due to spark absorbing current 91 and spark absorbing current 92 shown by the arrows in FIG. 10.

However, there is a problem that the spark absorbing current does not uniformly flow in spark absorbing element 82. That is, spark absorbing current 91 (shown by solid line arrow) becomes far greater in value than spark absorbing current 92 (shown by broken line arrow), and consequently, the current is concentrated at contact portion 95 between spark absorbing element 82 and commutator segment 80. As a result, the varistor characteristic is greatly lowered, and the spark voltage absorbing performance is not sufficiently displayed, resulting in worsening of the brush life. Also, when used in a high-voltage motor, local self-heating around contact portion 95 is enhanced and there is a possibility of deterioration of the element.

Patent document 1 Unexamined Japanese Patent Publication H8-237913.

Patent document 2 Unexamined Japanese Patent Publication H10-257739.

SUMMARY OF THE INVENTION

A mold commutator of the present invention comprises a plurality of commutator segments made of copper or copper alloy and circumferentially arranged, a plurality of spark absorbing elements with paired parallel surfaces respectively having electrodes thereon, and a resin mold portion, with the spark absorbing elements disposed between the respectively adjacent commutator segments, which integrates the plurality of commutator segments and the plurality of spark absorbing elements into one piece.

The spark absorbing element is electrically connected to the commutator segment via the electrode. Spark voltage generated at the commutator segment is absorbed by current that flows between the electrodes. The present invention further includes a commutator motor using the mold commutator.

Due to the configuration of the present invention, the current flows in the direction of thickness of the spark absorbing element, and the energy tolerated capacity against sparks of the elements can be increased. Further, it is possible to maximize the area of each electrode, and because the current can be applied in shortest distance, the spark absorbing function can be enhanced. Accordingly, when used in a high-voltage motor, the voltage between commutator segments also becomes higher and, therefore, leak current can be suppressed and heating or the like can be minimized. It is possible to provide a mold commutator and a commutator motor having a simple configuration and ensuring excellent reliability and long life.

DESCRIPTION OF REFERENCE MARKS

| | |
|---|---|
| 1 | Field system |
| 2 | Field core |
| 3 | Field winding |
| 5 | Bearing |
| 10 | Armature |
| 11 | Rotary shaft |
| 12 | Armature core |
| 13 | Armature winding |
| 17 | Rotating fan |
| 18 | Air guide |
| 22 | Bracket |
| 23 | Brush holder |
| 24 | Screw |
| 25 | Intake port |
| 26 | Exhaust port |
| 31 | Crossover portion |
| 40 | Commutator |
| 41, 41a | Commutator segment |
| 42 | Groove |
| 43 | Buried concave |
| 47 | Anchor portion |
| 48, 48a | Hook |
| 49, 49a | Undercut |
| 50, 50a | Spark absorbing element |
| 51, 51a | Spark absorbing element main body |
| 52, 52a | Electrode |
| 56 | Current flowing in spark absorbing element |
| 60, 61 | Resin mold portion |
| 65 | Ceramic pin |

PREFERRED EMBODIMENT FOR CARRYING OUT THE INVENTION

The preferred embodiments of the present invention will be described in the following with reference to the drawings.

Preferred Embodiment 1

Figure 1:
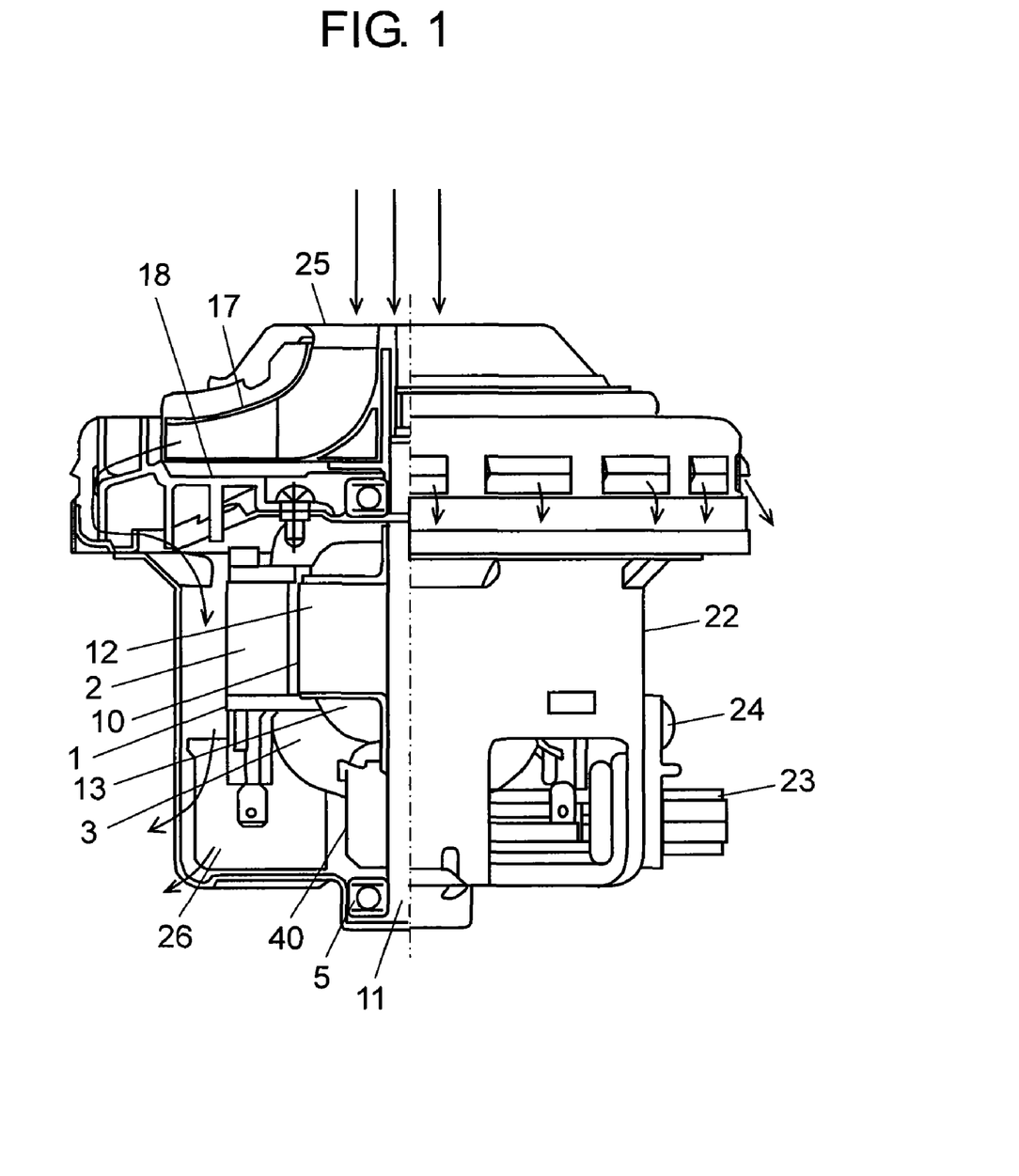
FIG. 1 is the appearance of a commutator motor in the preferred embodiment 1 of the present invention.

First, the description is given with reference to FIG. 1 showing the appearance of a commutator motor equipped with the mold commutator of the present invention. Also, the commutator motor is used with AC power of supply voltage 100V to 240V.

In FIG. 1, field system 1 is formed with field winding 3 wound around field core 2. Armature 10 is formed with armature winding 13 wound around armature core 12 fixed on rotary shaft 11, and commutator 40 is disposed on the shaft, which is rotatably journaled on bearing 5 disposed at each end of rotary shaft 11.

Field system 1 is secured by bracket 22, and a pair of carbon brushes (not shown) are fixed by screw 24 on bracket 22 via brush holder 23. Also, rotary shaft 11 is provided with rotating fan 17, and air guide 18 forming an air passage is disposed at the outer periphery and bottom thereof.

In the above configuration, when power is supplied, current flowing in field winding 3 goes to commutator 40 through carbon brushes (not shown), then a force is generated between the magnetic flux generated at field core 2 and the current passing through armature winding 13, causing armature 10 to rotate. The rotation of armature 10 causes rotating fan 17 to rotate, and the air taken in from intake port 25 passes through the arrow-marked passage to cool armature 10, field system 1, and carbon brushes, and is discharged from exhaust port 26 of bracket 22.

Figure 2:
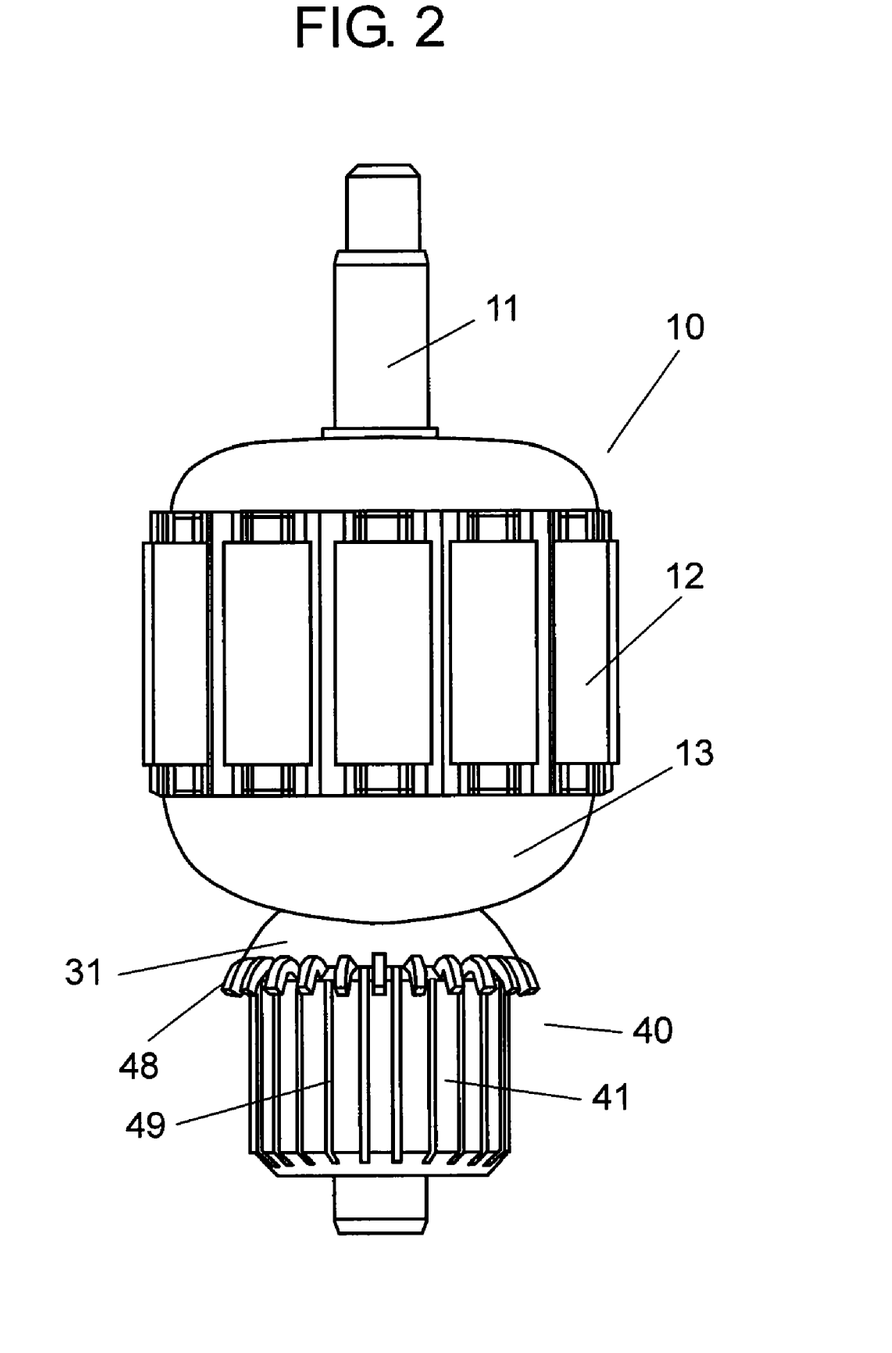
FIG. 2 is the appearance of an armature and commutator portion in the preferred embodiment 1 of the present invention.

FIG. 2 shows the detail of armature 10 of the present invention described with reference to FIG. 1. Armature core 12 and commutator 40 are fitted on rotary shaft 11 by a press-fitting or shrink-fitting method. Armature winding 13 is wound around armature core 12. Armature winding 13 wound thereon is joined to hook 48 of commutator 40 via crossover portion 31.

Figure 3:
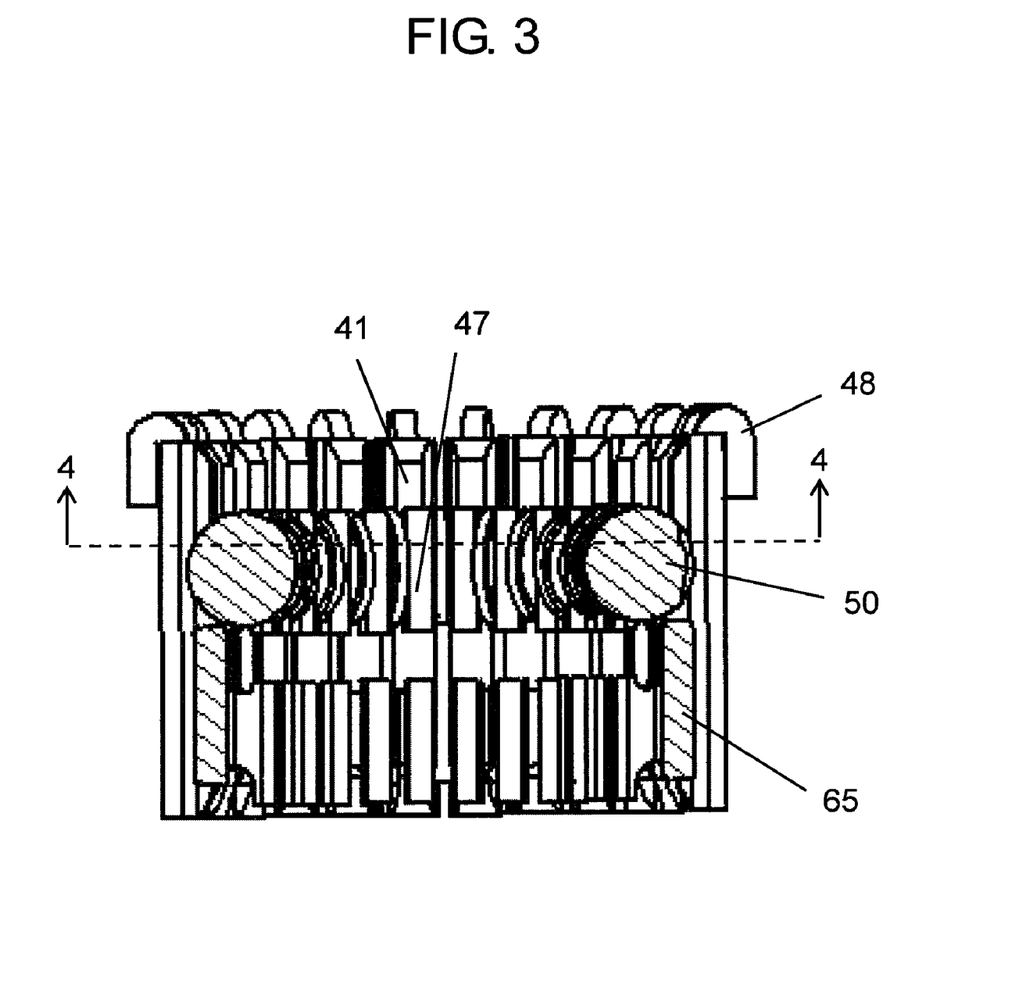
FIG. 3 is a longitudinal sectional view of a commutator in the preferred embodiment 1 of the present invention.
Figure 4:
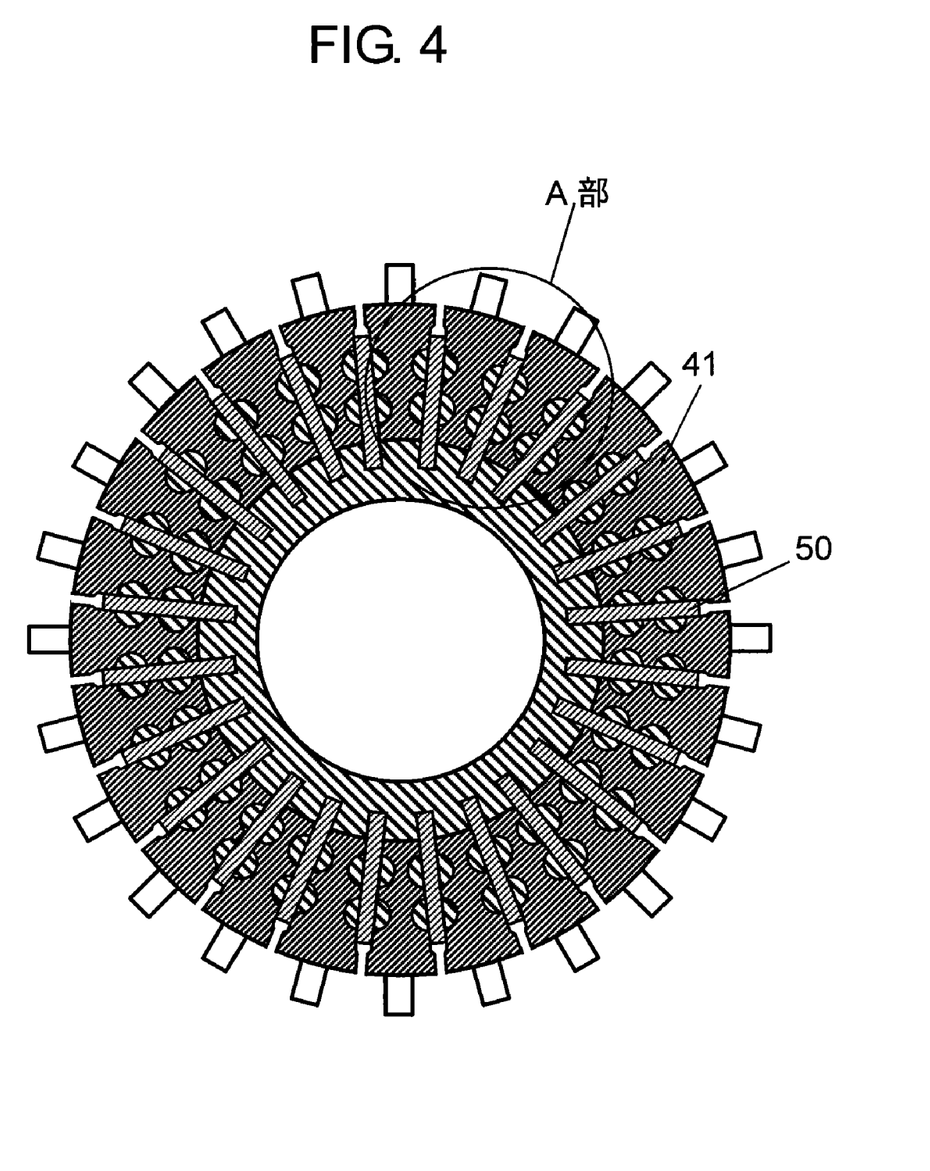
FIG. 4 is a cross-sectional view of the commutator.
Figure 5:
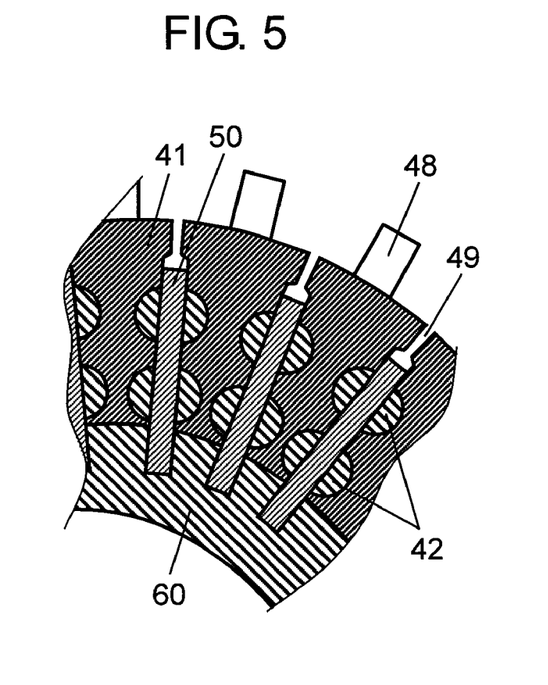
FIG. 5 is an enlarged view of portion A in FIG. 4.

The specific configuration of commutator 40 in the preferred embodiment 1 of the present invention will be described in the following. FIG. 3 is a longitudinal sectional view of the commutator in the preferred embodiment 1 of the present invention. FIG. 4 is a cross-sectional view of the preferred embodiment, and FIG. 5 is an enlarged view of portion A in FIG. 4.

Commutator segments 41 of commutator 40 in the present preferred embodiment are circumferentially arranged as shown in these figures. Commutator segment 41 is made of copper alloy with silver added by about 0.07 wt % to electrolytic copper having excellent conductivity in order to improve the workability. And, a special die is used to form the commutator segment in the lengthwise direction in a state of being pulled out continuously, followed by press-machining to obtain the final shape. The material for the commutator segment is not limited to copper alloy, and for example, it is allowable to use copper.

Ceramic pin 65 is a cylindrical pin whose shape matches the end groove at each side in the rotational direction of commutator segment 41, which is made of alumina ceramic. And, disk-like spark absorbing element 50 is disposed between commutator segments 41. In the present preferred embodiment, commutator segments 41, 24 pieces in total, are circumferentially arranged, and therefore, 24 pieces in total of ceramic pins 65, and 24 pieces in total of spark absorbing elements 50 are disposed between them. These are alternately assembled for temporary assembling and press-fitted into a mold forming ring. In this way, ceramic pin 65 and spark absorbing element 50 are held under pressure by means of commutator segment 41. As a result, commutator segment 41 is reinforced by ceramic pin 65 against centrifugal forces applied thereto in high speed operation.

Figure 6:
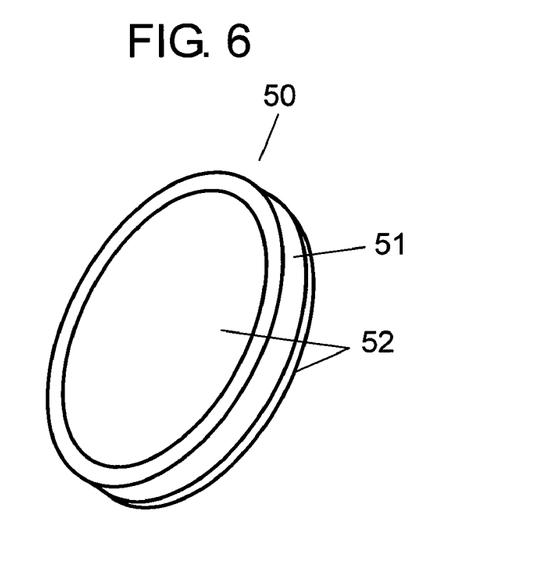
FIG. 6 is a perspective view of a spark absorbing element in the preferred embodiment 1 of the present invention.

FIG. 6 is a perspective view of spark absorbing element 50 in the present preferred embodiment. Spark absorbing element 50 has a disk-like shape as shown in FIG. 6. Also, it is preferable to be at least 0.5 mm in thickness. This is because the varistor voltage is determined by the thickness of spark absorbing element (more specifically, the size of crystal grain in spark absorbing element). If it is less than 0.5 mm in thickness, it will be difficult to adjust the size of crystal grain in order to obtain the necessary varistor voltage. Also, in case it is less than 0.5 mm, the mechanical strength of spark absorbing element is extremely lowered, and there may arise a problem of cracking or breaking. Also, the spark absorbing element is preferable to be 1.5 mm or less in thickness. This is because if the thickness exceeds 1.5 mm, there will be a technical problem, and disadvantages with respect to the productivity and cost. That is, if it exceeds 1.5 mm, it will be required to make the grain size per crystal grain 70 to 80 μm or over in order to obtain the necessary varistor voltage. And for the growth of crystal grain up to this level, it is necessary to make the burning time longer or to make the burning temperature higher. In that case, it is difficult for the presently available technology to meet the requirement, and also, it brings about great disadvantages with respect to the productivity and cost. Also, even in case of being successful in overcoming such difficulty, making the burning time longer and the burning temperature higher to obtain the desired grain size, α value will become smaller, increasing the leak current, and it may cause the characteristic to be deteriorated.

And it is configured in that electrode 52 is disposed on the surface and back of spark absorbing element main body 51. The area of electrode 52 is at least 80% of the area of spark absorbing element main body 51. Current flowing in spark absorbing element 50 flows in the direction of thickness of spark absorbing element main body 51 so that the current uniformly and effectively flows in spark absorbing element main body 51. That is, it is preferable to set the area of the electrode as large as possible so that the current uniformly flows in the spark absorbing element as a whole, avoiding the current to be concentrated on a part thereof. That is, the area is preferable to be at least 80% of the area of spark absorbing element main body. If it is less than 80%, out of the surface and back areas of spark absorbing element, portions without electrodes will not be effectively used, and then the flow of current is concentrated on portions with electrodes. Consequently, it will accelerate the deterioration of spark absorbing elements and possibility of their breakdown.

Commutator segment 41 is provided with groove 42 at portions coming in contact with spark absorbing element 50 at each of the side surfaces. The sectional shape of groove 42 is semicircular, and it is preferable to provide each of the side surfaces with two pieces. Each side surface of commutator segment 41 is electrically connected to electrode 52 at the surface and back of spark absorbing element 50. A proper connecting method is selected from press-fitting, conductive adhesive, and soldering methods. Groove 42 is integrally filled with resin mold portion 60, and thereby, spark absorbing element 50 is further secured. Also, it is possible to prevent inclining or breaking of spark absorbing element 50 in molding and to protect spark absorbing element 50 against centrifugal forces in high speed operation. The number of grooves 42 at each side surface is not limited to two pieces, and for example, one piece or three piece is properly selected. Also, the shape is not limited to semicircular shape.

As described above, commutator segment 41 is connected to electrode 52 of spark absorbing element 50, then the spark voltage generated at commutator segment 41 is absorbed by current flowing in the direction of thickness of spark absorbing element main body 51. Since the current uniformly flows without partial concentration as in the conventional example, it is possible to enhance the spark voltage absorbing performance.

As spark absorbing element 50, a so-called varistor element having non-linear resistance characteristic is employed. And the varistor voltage is defined as a voltage value with 1 mA current applied to spark absorbing element 50. Non-linear resistance index a is calculated from the voltage value in application of currents, 1 mA and 100 μA, by using the following formula:

$$\alpha = (\log I1 - \log I2)/(\log V1 - \log V2)$$

where, I1=1 mA, I2=100 μA, and V1, V2 are voltage values in I1, I2 respectively.

When non-linear resistance index α is higher, the current (spark current) flowing between varistor elements is more stable, and further, the spark voltage erasing effect is higher. The α value of strontium titanate varistor is about 2 to 10, while it is possible for zinc oxide varistor to have α value of about 20 to 60, which is therefore very useful to obtain a spark absorbing effect.

The physical content of spark absorbing element 50 will be described in the following. Spark absorbing element 50 is a so-called varistor based on zinc oxide. More specifically, oxides of bismuth oxide ($Bi_2O_3$), cobalt oxide (CoO), nickel oxide (NiO), manganese oxide (MnO), chrome oxide ($Cr_2O_3$), aluminum oxide ($Al_2O_3$), silicon oxide ($SiO_2$), tin oxide ($SnO_2$), and antimony oxide ($Sb_2O_3$) are added to zinc oxide (ZnO) powder to make the mixed powder to be used. Polyvinyl alcohol is added to the powder as a binder, and it is granulated by spray dryer in order to make the composition uniform in quality. After that, it is press-formed into a predetermined ring shape.

The average grain size of zinc oxide powder used ranges from 0.6 μm to 3 μm, the burning temperature ranges from 900° C. to 1200° C., the burning time ranges from 3 hours to 30 hours, and the temperature increasing speed ranges from 20° C./hour to 100° C./hour. Under the conditions, the crystal grain size of zinc oxide is adjusted in order to make the adjustment to the predetermined varistor voltage.

After that, silver electrode 52 is formed by mask-printing on the surface and back of the disk-like shape, and thereby, spark absorbing element 50 is completed.

Further, resin mold portion 60 shown in FIG. 4 and FIG. 5 uses thermosetting resin (for example, phenol resin), to which at least one of aluminum oxide, silicon carbide and glass fiber is added as an additive material, and integrates commutator segment 41, spark absorbing element 50, and ceramic pin 65 into one piece. After that, the segments are separated from each other by executing undercut 49 for the purpose of insulating each commutator segment, and thereby, mold commutator 40 of the present invention is completed.

According to the present preferred embodiment, each side surface of commutator segment 41 is electrically connected to surface and back electrodes 52 of spark absorbing element 50. Accordingly, for absorbing sparks generated between adjacent commutator segments, the current can be applied in the direction of thickness of spark absorbing element 50. As a result, the energy tolerated capacity can be more increased as compared with a structure having an electrode disposed on one side. Also, spark voltage generated between commutators in motor operation is absorbed in the direction of thickness of spark absorbing element 50, and it is possible to set the varistor characteristic between commutator segments by making thickness adjustment. Therefore, it is possible to cope with the change of motor specification, greatly enhancing the versatility. Accordingly, it can be applied to a high-voltage motor used with AC power of 100V to 240V or various motor specifications.

Preferred Embodiment 2

Figure 7:
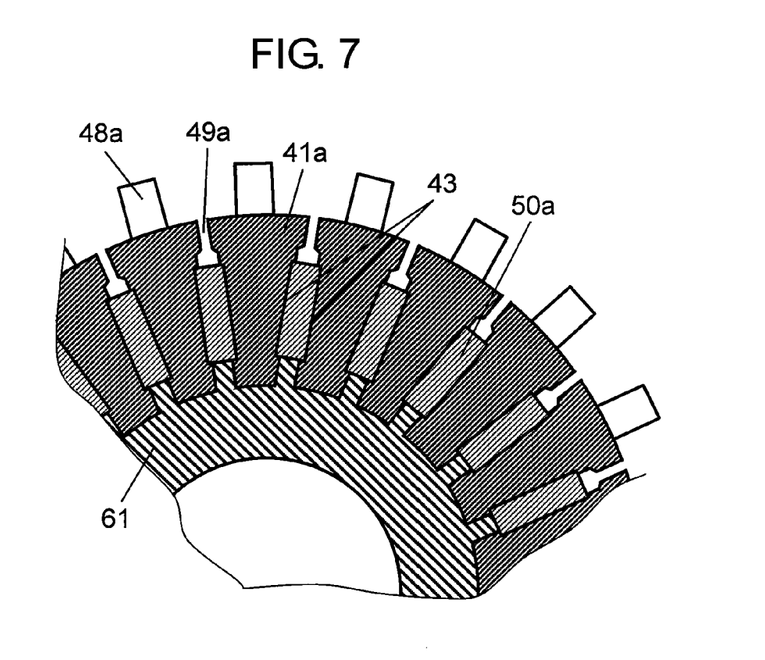
FIG. 7 is a partly sectional view of a spark absorbing element inserted portion in the preferred embodiment 2 of the present invention.
Figure 8:
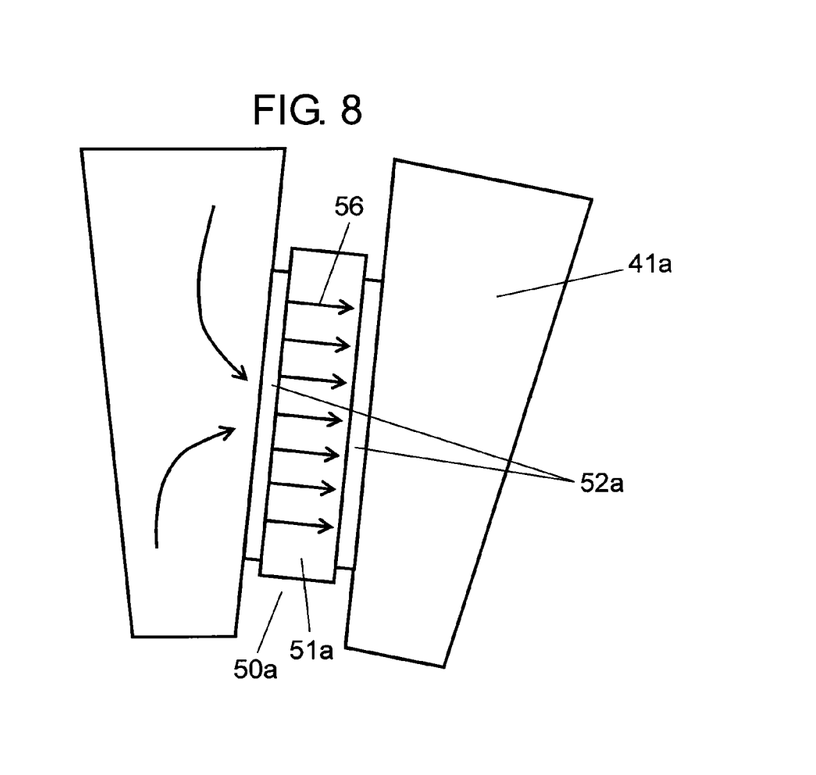
FIG. 8 is an explanatory diagram of a passage of current that flows in the spark absorbing element in the preferred embodiment 2 of the present invention.

FIG. 7 is a partly sectional view of a spark absorbing element inserted portion in the preferred embodiment 2 of the present invention. FIG. 8 is an explanatory diagram of a passage of current flowing in the spark absorbing element.

Commutator segment 41a in the present preferred embodiment is provided with buried concave 43 in place of groove 42 in the preferred embodiment 1. And, spark absorbing element 50a is inserted and buried in buried concave 43 between adjacent commutator segments 41a. The shape of spark absorbing element 50a is preferable to be square plate-like. Spark absorbing element 50a is formed of spark absorbing element main body 51a and electrodes 52a disposed on both surface and back surfaces thereof. And, the area of electrode 52a is at least 80% of the area of spark absorbing element main body 51a the same as in the preferred embodiment 1. As shown in FIG. 8, spark absorbing current 56 uniformly flows in the direction of thickness of spark absorbing element main body 51a. Due to this configuration, it is possible to obtain same effects as in the preferred embodiment 1.

In the explanatory diagram of the current passage shown in FIG. 7, buried concave 43 is omitted. Also, the shape of spark absorbing element 50a is not limited to a square plate-like shape, and it is possible to properly select a disk-like or oval plate-like shape for example the same as in the preferred embodiment 1. Also, the thickness of spark absorbing element 50a is selected in a range from 0.5 mm to 1.5 mm the same as in the preferred embodiment 1. In this case, it is preferable to be a little thicker than in the preferred embodiment 1.

The results of experiments executed for the purpose of comparison with conventional examples, including the preferred embodiment 1 and the preferred embodiment 2, are described in the following.

Table 1 shows the varistor voltage and α values (non-linear resistance index) measured in the comparison between a spark absorbing element (pin-shaped) in the conventional example and a spark absorbing element (disk-like) in the preferred embodiment 1.

TABLE 1

| Measuring current | Varistor voltage (V) | | | | | α value (1 mA) | α value (10 mA) |
|---|---|---|---|---|---|---|---|
| | 0.001 mA | 0.01 mA | 0.1 mA | 1 mA | 10 mA | | |
| Spark absorbing element in the conventional example | 2.5 | 18.5 | 40.6 | 80.2 | 152.5 | 3.4 | 3.6 |
| Spark absorbing element in the preferred embodiment 1 | 71.7 | 66.8 | 74 | 82.7 | 88.2 | 20.6 | 35.6 |

As is obvious in this table, the spark absorbing element of the preferred embodiment 1 is far larger in α value as compared with the spark absorbing element of the conventional example. Therefore, it is clear that a high level of spark absorbing current can be applied and that a great spark voltage absorbing effect can be obtained.

In Table 2, the results of brush life measurement are shown with respect to four cases such as preferred embodiment 1 (disk-like), preferred embodiment 2 (square plate-like), conventional example (pin-shaped), and no spark absorbing element. As to the motor, AC voltage of 240V is applied in no-load status, orifice diameter 16 mm, rotating speed 37,000 rpm, 10⁻ min ON and 2⁻ min OFF condition for the measurement of the brush (motor) life. The brush length includes 30 mm allowance for wear.

TABLE 2

| | | Preferred embodiment 1 | Preferred embodiment 2 | Conventional example | No spark absorbing element |
|---|---|---|---|---|---|
| Commutator segment | Material | Copper alloy | Copper alloy | Copper alloy | Copper alloy |
| | Shape | Groove formed | Buried concave formed | Pin groove formed | — |
| | Plated | None | None | None | None |
| Spark absorbing element shape | | Disk-like | Square plate-like | Pin-shaped | None |
| Commutator segment varistor voltage (V) | Measured by 1 mA | 80 | 80 | 80 | — |
| Spark absorbing element thickness (mm) | | 0.75 | 1 | — | — |
| Electrode structure | | Plane electrode | Plane electrode | No electrode | — |

TABLE 2-continued

|  |  | Preferred embodiment 1 | Preferred embodiment 2 | Conventional example | No spark absorbing element |
|---|---|---|---|---|---|
| Voltage applied to motor (V) | AC voltage | 240 | 240 | 240 | 240 |
| Motor rotating speed (rpm) |  | 37000 | 37000 | 37000 | 37000 |
| Brush (motor) life (hours) |  | 800 | 900 | 600 | 450 |

From the results, it has been confirmed that the commutator motors using the mold commutator of the present invention shown in the preferred embodiment 1 and preferred embodiment 2 are nearly two times longer in brush life as compared with the case of using no spark absorbing element, and nearly 1.5 times longer as compared with the case of the structure of the conventional example, bringing about the effect of prolonging the life.

In the preferred embodiments described above, varistor elements are used as spark absorbing elements 50, 50a, but it is also allowable to use a combination of capacitor element and resistor element instead of varistor element. In this way, when capacitor element and resistor element are combined, it is possible to obtain same effect as in the case of using varistor element.

Also, in the preferred embodiments described above, ceramic pin 65 is disposed in the configuration employed, but it is also allowable to employ a configuration without ceramic pin 65. Particularly, in the configuration of preferred embodiment 2, spark absorbing element 50a is able to play the role of ceramic pin, and it is preferable as a configuration without ceramic pin 65.

INDUSTRIAL APPLICABILITY

Due to the mold commutator and commutator motor using the same of the present invention, the effect of absorbing sparks generated at commutator segments can be enhanced by applying current in the direction of thickness of spark absorbing element. Accordingly, it is possible to provide a mold commutator and a commutator motor, having a simple structure, excellent reliability, and long life, as a high voltage motor used in a vacuum cleaner, electric tool, etc.

The invention claimed is:

1. A mold commutator comprising:
a plurality of commutator segments made of copper or copper alloy and circumferentially arranged,
a plurality of spark absorbing elements with paired parallel surfaces having electrodes thereon, respectively, wherein one spark absorbing element is disposed between two adjacent commutator segments in electrical connection with the adjacent commutator segments via the electrodes; and
a resin mold portion which integrates the plurality of commutator segments and the plurality of spark absorbing elements into one piece,
wherein the respective commutator segment has a groove at a location facing the spark absorbing element, the groove being integrally filled by the resin mold portion, and spark voltage generated at one commutator segment is absorbed by current flowing between the electrodes.

2. The mold commutator of claim 1, wherein the spark absorbing element has a plate-like shape.

3. The mold commutator of claim 2, wherein the spark absorbing element has a circular or square shape.

4. The mold commutator of claim 2, wherein an area of the electrode of the spark absorbing element is at least 80% of an area of the plate-like shape.

5. The mold commutator of claim 1, wherein the electrode is configured so as to be electrically connected to the commutator segment.

6. The mold commutator of claim 1, wherein the spark absorbing element is an element having non-linear resistance characteristic.

7. The mold commutator of claim 1, wherein the spark absorbing element is a varistor based on zinc oxide.

8. The mold commutator of claim 1, wherein the spark absorbing element is 0.5 mm to 1.5 mm in thickness.

9. The mold commutator of claim 1, wherein the resin mold portion is formed from thermosetting resin containing at least one of aluminum oxide, silicon carbide, and glass fiber as an additive material.

10. A commutator motor comprising the mold commutator of claim 1, which is used with AC power of 100V to 240V.

11. A mold commutator comprising:
a plurality of commutator segments made of copper or copper alloy and circumferentially arranged, wherein two adjacent commutator segments have opposing recessed surfaces with a uniform distance between and across the recessed surfaces;
a plurality of spark absorbing elements with parallel opposite surfaces on each of which an electrode is formed to cover the surface nearly at its entirety, wherein one spark absorbing element is sandwiched between the opposing recessed surfaces of two adjacent commutator segments such that the entire areas of the electrodes are in electrical contact with the opposing recessed surfaces; and
a resin mold portion which integrates the plurality of commutator segments and the plurality of spark absorbing elements into one piece,
wherein an electric spark generated at one commutator segment is absorbed by current flowing in a thickness direction of the spark absorbing element substantially uniformly between the electrodes.

12. The mold commutator of claim 11, wherein the electrode of the spark absorbing element covers at least 80% of the respective opposite surfaces of the spark absorbing element.

* * * * *